US011909302B2

(12) United States Patent
Ramirez Sanchez et al.

(10) Patent No.: US 11,909,302 B2
(45) Date of Patent: Feb. 20, 2024

(54) ACTIVE NEUTRAL POINT CLAMPED SWITCH SEQUENCE FOR PARASITIC INDUCTANCE CONTROL OF A POWER CONVERSION ASSEMBLY

(71) Applicant: General Electric Company, Schenectady, NY (US)

(72) Inventors: Fernando Arturo Ramirez Sanchez, Salem, VA (US); Robert Gregory Wagoner, Roanoke, VA (US); Nathaniel Robert Michener, Roanoke, VA (US)

(73) Assignee: GE Infrastructure Technology LLC, Greenville, SC (US)

( * ) Notice: Subject to any disclaimer, the term of this patent is extended or adjusted under 35 U.S.C. 154(b) by 232 days.

(21) Appl. No.: 17/199,848

(22) Filed: Mar. 12, 2021

(65) Prior Publication Data
US 2022/0294333 A1    Sep. 15, 2022

(51) Int. Cl.
*H02M 1/08* (2006.01)
*H02M 5/458* (2006.01)
(Continued)

(52) U.S. Cl.
CPC ........... *H02M 1/08* (2013.01); *H02M 5/4585* (2013.01); *H02M 7/487* (2013.01); *H02P 9/007* (2013.01)

(58) Field of Classification Search
CPC .... H02M 1/08; H02M 5/4585; H02M 1/0051; H02M 7/003; H02M 7/487; H02M 1/088;
(Continued)

(56) References Cited

U.S. PATENT DOCUMENTS

| 5,686,859 A * | 11/1997 | Majumdar ............ H02M 7/538 327/423 |
| 7,573,732 B2 * | 8/2009 | Teichmann ........... H02M 7/487 363/51 |

(Continued)

FOREIGN PATENT DOCUMENTS

| CN | 111478609 A | 7/2020 |
| EP | 2884650 A1 | 6/2015 |

OTHER PUBLICATIONS

European Search Report for EP application No. 22156567.4, dated of Jul. 22, 2022.
(Continued)

*Primary Examiner* — Shawki S Ismail
*Assistant Examiner* — Htet Z Kyaw
(74) *Attorney, Agent, or Firm* — Dority & Manning, P.A.

(57) ABSTRACT

A method for operating a multi-level bridge power converter of an electrical power system connected to a power grid includes providing a plurality of switching devices of the power converter in an active neutral point clamped topology. The method also includes operating the plurality of switching devices in a plurality of operating states such that current simultaneously flows through at least two parallel recovery paths of the plurality of switching devices during operation of the power converter to minimize a commutation path of the current when at least one diode of the plurality of switching devices recovers, thereby reducing parasitic inductance affecting the recovering antiparallel diode or the switch.

17 Claims, 11 Drawing Sheets

(51) Int. Cl.
*H02M 7/487* (2007.01)
*H02P 9/00* (2006.01)

(58) Field of Classification Search
CPC .......... H02M 1/32; H02M 1/38; H02M 5/458; H02M 7/219; H02M 7/53871; H02P 9/007; H02J 3/381; H02J 2300/28; H02J 3/38

See application file for complete search history.

(56) References Cited

U.S. PATENT DOCUMENTS

| | | | |
|---|---|---|---|
| 10,063,161 | B2 | 8/2018 | Li et al. |
| 11,316,443 | B2* | 4/2022 | Du .......................... H02M 1/36 |
| 2015/0222201 | A1* | 8/2015 | Nakashima ........... H02M 7/003 363/131 |
| 2018/0109201 | A1* | 4/2018 | Li .......................... F03D 17/00 |

OTHER PUBLICATIONS

Belkhode, Satish, et al. Enhanced Hybrid Active-Neutral-Point-Clamped Converter With Optimized Loss Distribution-Based Modulation Scheme. IEEE Transactions on Power Electronics, vol. 36. No. 3, Aug. 21, 2020, pp. 3603-3604, figure 5.

\* cited by examiner

US 11,909,302 B2

ACTIVE NEUTRAL POINT CLAMPED SWITCH SEQUENCE FOR PARASITIC INDUCTANCE CONTROL OF A POWER CONVERSION ASSEMBLY

FIELD

The present disclosure relates generally to electrical power systems, and more particularly to an active neutral point clamped (ANPC) switch sequence for parasitic inductance control of a power conversion assembly, such as power converter in a wind turbine power system.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly-fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Referring to FIGS. 1 and 2, a multilevel inverter neutral point clamped (NPC) topology and multilevel inverter diode recovery paths according to conventional construction are illustrated, respectively. In FIG. 1, the solid arrows indicate hard diode recovery, the dotted arrows indicate lossless recovery, and the boxed arrows indicate transitions controlled by the current direction. As such, the multilevel inverter topology leverages the series connection of multiple switching devices to reach higher operating voltages. For example, as shown, during switching operations of the three-level inverter, the AC terminal can be electrically connected to three possible voltages, i.e., positive, negative and midpoint. Furthermore, as shown, connection to the midpoint voltage is typically completed through diodes D5 and D6. However, the presence of these alternate paths lead to the creation of long and short commutation paths, and thus, different parasitic inductance levels.

More specifically, such differences create large voltage overshoots at the inner switching devices (e.g., S2 and S3) as well as different recovery paths during diode turn off, e.g., due to the increased parasitic inductance. As used herein, the turnoff overshoots are directly caused by energy stored in the parasitic inductances of the bridge construction. This energy is proportional to the size of the inductance and the magnitude of the current being commutated. This excess voltage overshoot can damage the affected devices, and requires a gate driver design that results in more losses and less margin in the power converter. Increased parasitic inductance can also negatively affect diode operation, thereby causing increased diode losses and reduced converter rating.

For example, as shown from Operating State 5 (OS5) to Operating State 3 (OS3) and from Operating State 2 (OS2) to Operating State 4 (OS4) in FIG. 2, diodes D1 and D4 have a long recovery path with high loop inductance, thereby resulting in larger losses in diodes D1 and D4. For example, as shown in FIG. 3, a layout of a plurality of insulated gate bipolar transistor (IGBT) modules 10 is illustrated, in which a transition from Operating State 5 (OS5) to Operating State 3 (OS3) causes a long recovery path RP for one of the diodes. More particularly, as shown, the recovery path RP has to physically cover the entire phase module, thereby leading to high loop inductance.

Such losses translates to more heat and lower bridge rating. Thus, typical solutions for reducing the voltage overshoots include soft switching and/or snubber circuits, which can cause slower switching speeds and increased costs.

Accordingly, the present disclosure is directed to an alternative ANPC switching sequence that reduces the converter parasitic inductance and interrupting current. More specifically, the ANPC switching sequence of the present disclosure is configured to operate the switching devices of the power converter in a plurality of operating states such that current simultaneously flows through at least two parallel recovery paths.

BRIEF DESCRIPTION

Aspects and advantages of the disclosure will be set forth in part in the following description, or may be obvious from the description, or may be learned through practice of the disclosure.

In one aspect, the present disclosure is directed to a method for operating a multi-level bridge power converter of an electrical power system connected to a power grid. The power converter includes a first converter coupled to a second converter via a DC link. The method includes providing a plurality of switching devices of the power converter in an active neutral point clamped topology. The method also includes operating the plurality of switching devices in a plurality of operating states such that current simultaneously flows through at least two parallel recovery paths of the plurality of switching devices during operation of the power converter to minimize a commutation path of the current when at least one antiparallel diode or switch of the plurality of switching devices recovers, thereby reducing parasitic inductance affecting the antiparallel diode or the switch.

In an embodiment, the plurality of switching devices is a plurality of insulated gate bipolar transistor (IGBT) modules. In such embodiments, each of the plurality of IGBT modules may include at least one IGBT switch and at least one antiparallel diode.

In particular embodiments, for example, the plurality of IGBT modules may include a first IGBT module having a first IGBT switch coupled to a first antiparallel diode, a second IGBT module having a second IGBT switch coupled to a second antiparallel diode, a third IGBT module having a third IGBT switch coupled to a third antiparallel diode, a fourth IGBT module having a fourth IGBT switch coupled to a fourth antiparallel diode, a fifth IGBT module having a fifth IGBT switch coupled to a fifth antiparallel diode, and a sixth IGBT module having a sixth IGBT switch coupled to a sixth antiparallel diode. Furthermore, in an embodiment, the diode(s) may be at least one of the first antiparallel diode, the second antiparallel diode, the third antiparallel diode, the fourth antiparallel diode, the fifth antiparallel diode, and/or the sixth antiparallel diode.

In further embodiments, the method may also include electrically coupling the first and fifth IGBT module together in series to form a first IGBT module package, electrically coupling the second and third IGBT module together in series to form a second IGBT module package, and electrically coupling the fourth and sixth IGBT module together in series to form a third IGBT module package.

In additional embodiments, the method may include electrically coupling a gate amplifier at a connection between at least one of the first and fifth IGBT module, the second and third IGBT module, and/or the fourth and sixth IGBT module.

In several embodiments, operating the plurality of switching devices in the plurality of operating states such that current simultaneously flows through the at least two parallel recovery paths of the plurality of switching devices during operation of the power converter may include electrically connecting an alternating current (AC) terminal of the power converter to one of a positive voltage terminal, a negative voltage terminal, or a midpoint voltage terminal via one or more of the plurality of switching devices.

In particular embodiments, the plurality of operating states may include at least one of a first operating state having the AC terminal electrically connected to the positive voltage terminal by closing the first and second IGBT switches, a second operating state having the AC terminal electrically connected to the positive voltage terminal by closing the first and second antiparallel diodes, a third operating state having the AC terminal electrically connected to the midpoint voltage terminal by closing the second and sixth IGBT switches and the third and fifth antiparallel diodes, a fourth operating state having the AC terminal electrically connected to the midpoint voltage terminal by closing the third and fifth IGBT switches and the second and sixth antiparallel diodes, a fifth operating state having the AC terminal electrically connected to the negative voltage terminal by closing the third and fourth antiparallel diodes, and a sixth operating state having the AC terminal electrically connected to the negative voltage terminal by closing the third and fourth IGBT switches.

In another embodiment, operating the plurality of switching devices in the plurality of operating states such that current simultaneously flows through the at least two parallel recovery paths of the plurality of switching devices during operation of the power converter may include transitioning from the fifth operating state to the third operating state such that the current from recovery of the first and fourth diodes flows through the at least two parallel recovery paths, at least one of the two parallel recovery paths being shorter than the other.

In still further embodiments, operating the plurality of switching devices in the plurality of operating states such that current simultaneously flows through the at least two parallel recovery paths of the plurality of switching devices during operation of the power converter may include transitioning from the second operating state to the fourth operating state such that the current from recovery of the first and fourth diodes flows through the at least two parallel recovery paths, at least one of the two parallel recovery paths being shorter than the other.

In further embodiments, operating the plurality of switching devices in the plurality of operating states may include transitioning from the third operating state to the fifth operating state by turning off the second IGBT switch, thereby allowing a first parasitic inductance between the fifth diode and the second IGBT switch to discharge energy without forcing excessive voltage across the second IGBT switch and then subsequently turning off the sixth IGBT switch, thereby allowing energy in a second parasitic inductance between the sixth IGBT switch and the third antiparallel diode to remain as-is. Moreover, in an embodiment, operating the plurality of switching devices in the plurality of operating states may include transitioning from the fourth operating state to the second operating state by turning off the third IGBT switch, thereby allowing the second parasitic inductance to discharge energy without forcing excessive voltage across the third IGBT switch and subsequently turning off the fifth IGBT switch, thereby allowing energy in the first parasitic inductance to remain as-is.

In particular embodiments, the multi-level bridge power converter may be a three-level bridge power converter. In further embodiments, the electrical power system may be a wind turbine power system, a solar power system, an energy storage power system, or combinations thereof.

In another aspect, the present disclosure is directed to an electrical power system. The electrical power system includes a doubly-fed induction generator having a rotor and a stator. The stator provides AC power to a stator bus. The electrical power system also includes a multi-level bridge power converter coupled to the rotor of the doubly-fed induction generator. The power converter includes a first converter coupled to a second converter via a DC link. At least one of the first converter or the second converter includes a plurality of switching devices arranged in an active neutral point clamped topology. The electrical power system further includes a controller communicatively coupled to the power converter. As such, the controller includes at least one processor configured to implement a plurality of operations, including but not limited to operating the plurality of switching devices in a plurality of operating states such that current simultaneously flows through at least two parallel recovery paths of the plurality of switching devices during operation of the power converter to minimize a commutation path of the current when at least one antiparallel diode or switch of the plurality of switching devices recovers, thereby reducing parasitic inductance affecting the antiparallel diode or the switch. It should be understood that the electrical power system may further include any of the additional features described herein.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
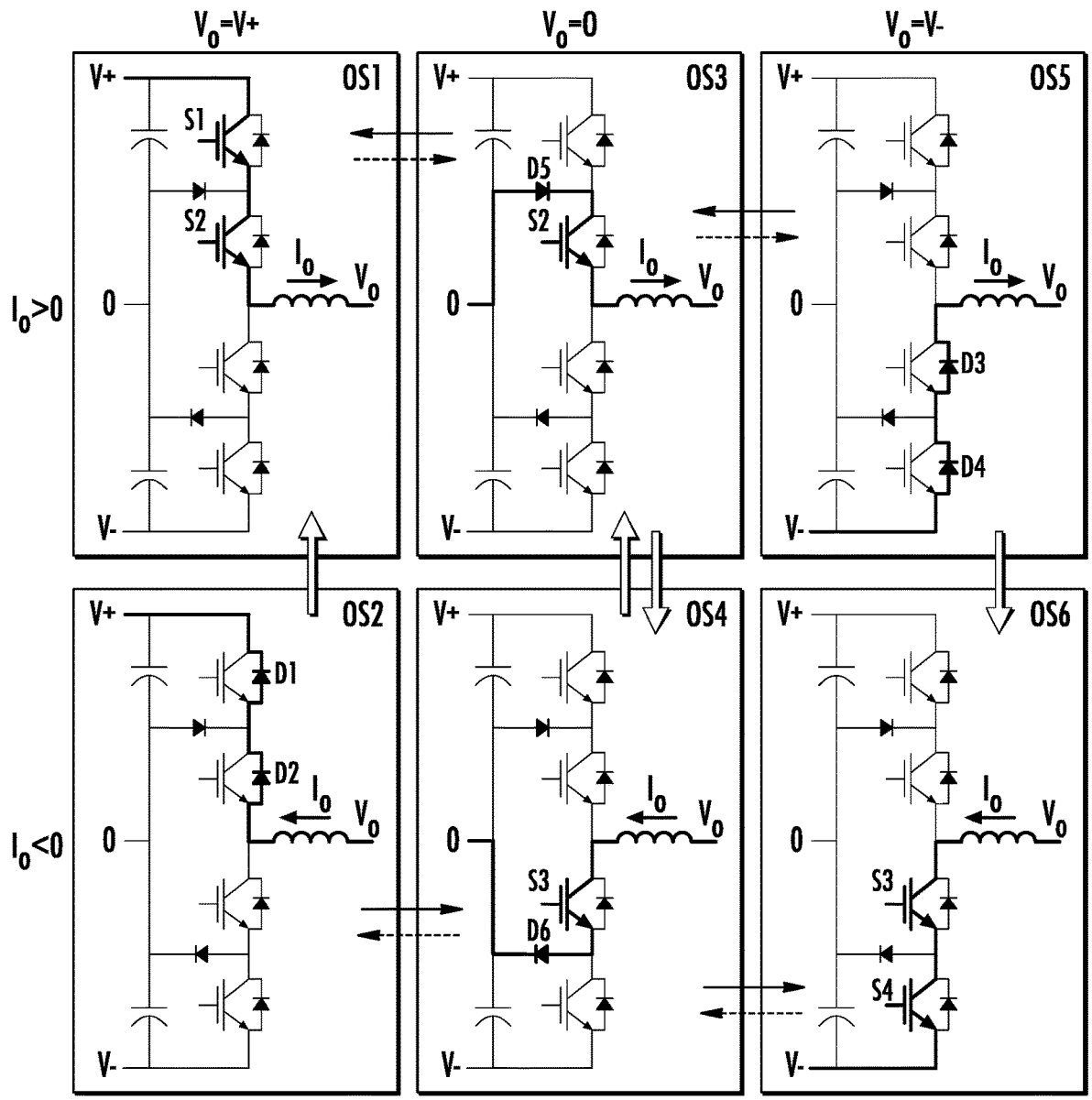
FIG. 1 illustrates a schematic diagram of a switching sequence of a three-level inverter according to conventional construction.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

On a typical three-level inverter, there are various operating states and transitional dead time states. Accordingly, for a typical inverter, the inner switching devices can interrupt current while coming out of the dead time state and/or the neutral state. More particularly, during these states, the current flows through one IGBT switch and one diode (e.g., S2/D5 or S3/D6 of FIG. 1). Accordingly, conventional operation can lead to large loses in one or more of the diodes, which translates to increased temperature of the switching devices and a lower bridge rating. Accordingly, the system and method of the present disclosure uses the ANPC topology to control inductance instead of temperature, which allows current to always flow through two parallel recovery paths (e.g., D5/S2 and S6/D3 or D2/S5 and S3/D6 of FIG. 4). This change effectively helps to provide a short commutation path when a diode or switch recovers. Furthermore, the system and method of the present disclosure also decreases the amount of current being interrupted when S2/S3 is turned off as the current is divided in two parallel recovery paths with similar impedance.

As used herein, diode recovery generally refers to the process by which a diode transitions from conducting current to blocking voltage. Accordingly, the charge carriers in the diode must be removed through the commutation path. This removal of charge is a current flowing through the diode while blocking voltage is present at the diode terminal. Thus, the diode is dissipating a large amount of power, which is a function of current and voltage. The longer the commutation path is, the higher the losses are from this operation.

It should be appreciated that numerous advantages may be provided by operating a power converter as described herein. Specifically, the systems and methods of the present disclosure can be applied to many electrical power systems, such as a wind turbine power system, a solar power system, an energy storage power system, or combinations thereof. Further, the present disclosure does not require additional hardware. Moreover, the present disclosure enables the power converter to extend its safe operating area (SOA) without adding more semiconductors.

Figure 2:
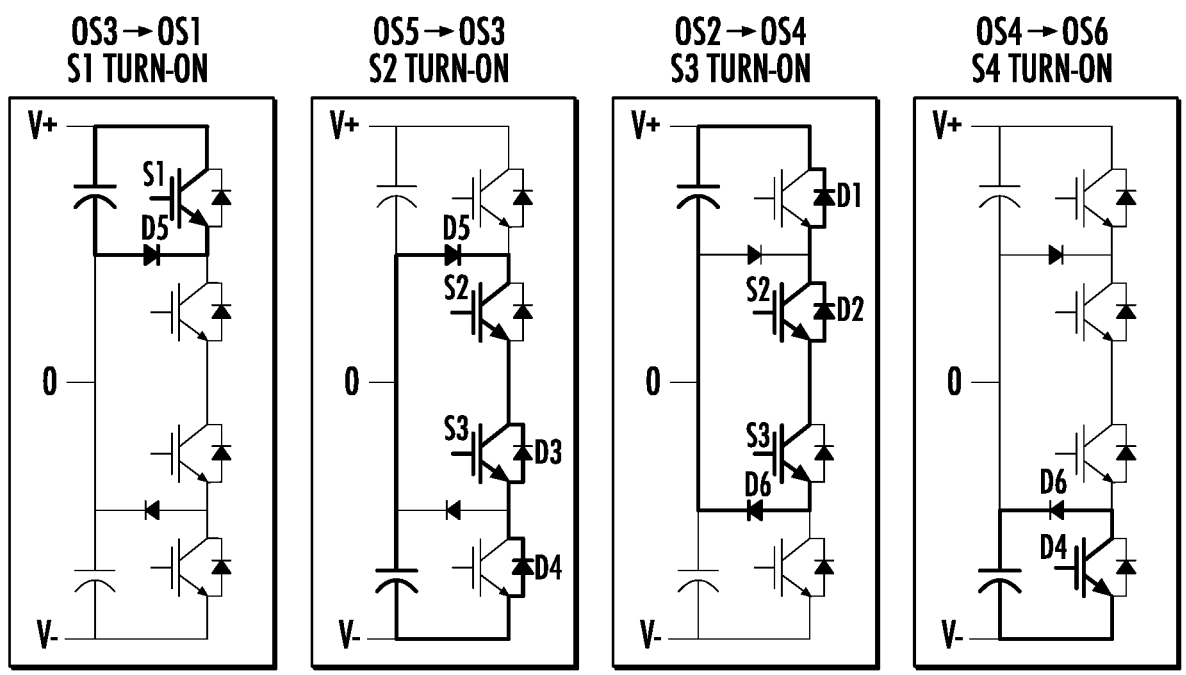
FIG. 2 illustrates a schematic diagram of diode recovery paths for a three-level inverter according to conventional construction.
Figure 4:
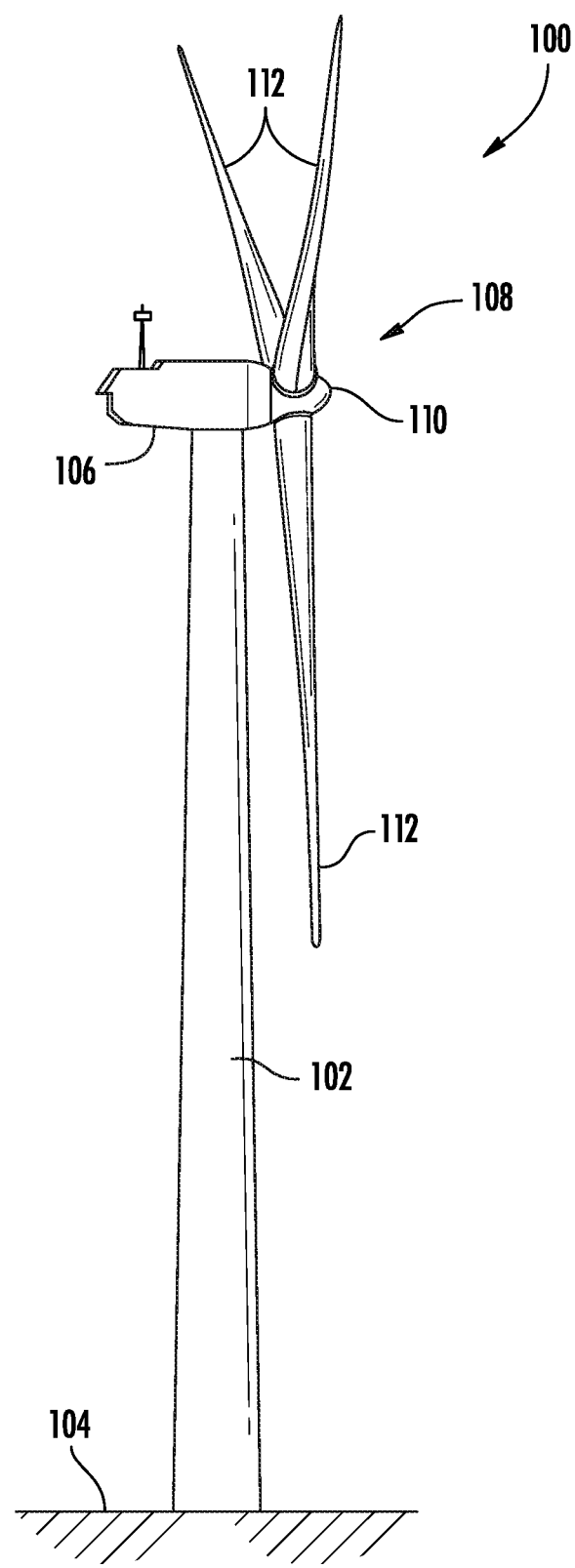
FIG. 4 illustrates a perspective view of one embodiment of a wind turbine according to the present disclosure.

Referring now to the drawings, FIG. 4 illustrates a perspective view of one embodiment of a wind turbine 100. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 10. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, as will be described below, the rotor 108 may be rotatably coupled to an electric generator 220 (FIG. 2) to permit electrical energy to be produced.

Figure 5:
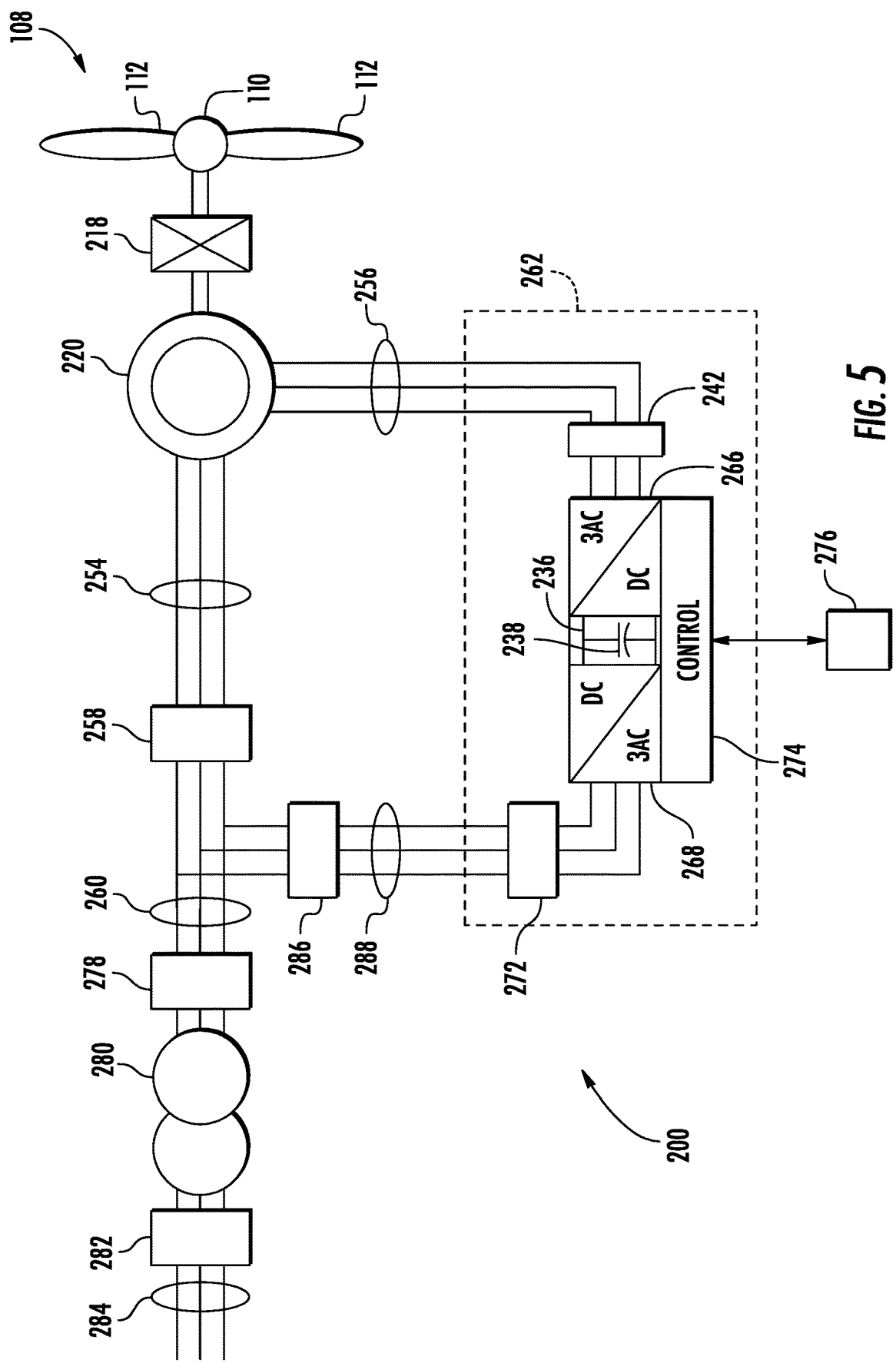
FIG. 5 illustrates a schematic diagram of one embodiment of a DFIG wind turbine system according to the present disclosure.

Referring now to FIG. 5, a schematic diagram of one embodiment of a DFIG wind turbine system 200 is illustrated in accordance with aspects of the present subject matter. It should be appreciated that the present subject matter will generally be described herein with reference to the system 200 shown in FIG. 5. However, those of ordinary skill in the art, using the disclosures provided herein, should understand that aspects of the present disclosure may also be applicable in other power generation systems.

As shown, the rotor 108 of the wind turbine 100 may, optionally, be coupled to a gear box 218, which is, in turn, coupled to a generator 220. In accordance with aspects of the present disclosure, the generator 220 is a doubly-fed induction generator (DFIG). For example, as shown, the DFIG 220 may be coupled to a stator bus 254 and a power converter 262 via a rotor bus 256. The stator bus 254 may provide an output multiphase power (e.g., three-phase power) from a stator of the DFIG 220 and the rotor bus 256 may provide an output multiphase power (e.g., three-phase power) from a rotor of the DFIG 120. As shown in FIG. 5, the power converter 262 includes a rotor side converter 266 and a line side converter 268. The DFIG 220 may be coupled via the rotor bus 256 to the rotor side converter 266. Additionally, the rotor side converter 266 may be coupled to the line side converter 268 which may, in turn, be coupled to a line side bus 288. In particular embodiments, the power converter 262 may be a multi-level bridge power converter, such as a three-level bridge power converter, or higher. As described herein, three-level converters are converters that have three direct current (DC) poles. In addition to positive and negative DC poles, such converters also have a neutral DC pole.

Figure 3:
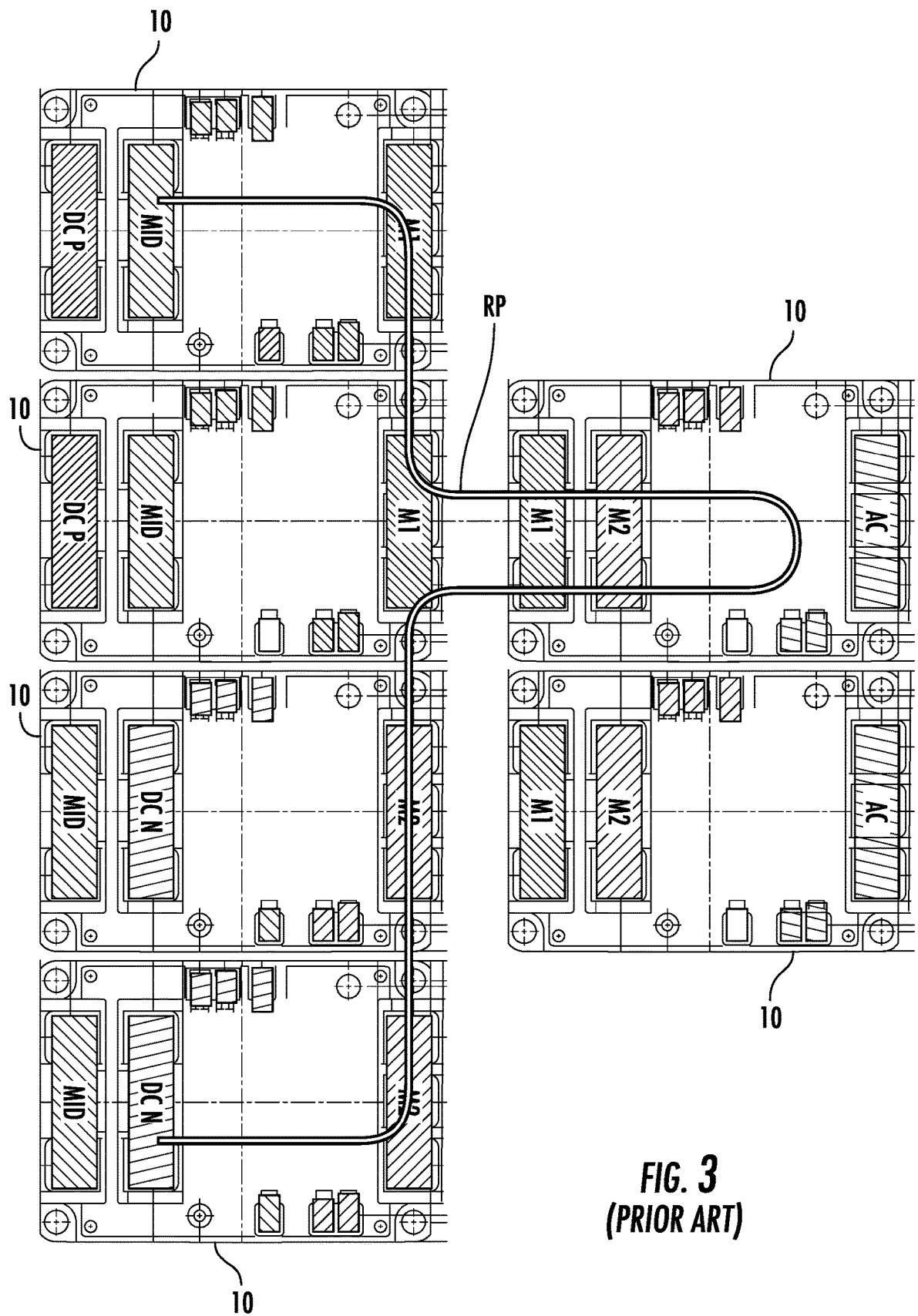
FIG. 3 illustrates a schematic diagram of a plurality of IGBT modules connected according to conventional construction, particularly illustrating a long recovery path for one of the diodes.

In several embodiments, the rotor side converter 266 and the line side converter 128 may be configured for normal operating mode in a three-phase, pulse width modulation (PWM) arrangement using insulated gate bipolar transistor (IGBT) switching devices as will be discussed in more detail with respect to FIG. 3. The rotor side converter 126 and the line side converter 268 may be coupled via a DC link 126 across which is a DC link capacitor 238.

In addition, the power converter 262 may be coupled to a controller 274 in order to control the operation of the rotor side converter 266 and the line side converter 268. It should be noted that the controller 124 may, in several embodiments, be configured as an interface between the power converter 262 and a control system 276. The controller 274 may include any number of control devices. In one embodiment, the controller 274 may include a processing device (e.g., microprocessor, microcontroller, etc.) executing computer-readable instructions stored in a computer-readable medium. The instructions when executed by the processing device may cause the processing device to perform operations, including providing control commands to the switching devices and/or the shorting devices of the power converter 262.

In typical configurations, various line contactors and circuit breakers including, for example, a grid breaker 282 may also be included for isolating the various components as necessary for normal operation of the DFIG 220 during connection to and disconnection from the electrical grid 284. For example, a system circuit breaker 278 may couple the system bus 260 to a transformer 280, which may be coupled to the electrical grid 284 via the grid breaker 282. In alternative embodiments, fuses may replace some or all of the circuit breakers.

In operation, alternating current power generated at the DFIG 220 by rotating the rotor 108 is provided via a dual path to the electrical grid 284. The dual paths are defined by the stator bus 254 and the rotor bus 256. On the rotor bus side 256, sinusoidal multi-phase (e.g., three-phase) alternating current (AC) power is provided to the power converter 262. The rotor side power converter 266 converts the AC power provided from the rotor bus 256 into direct current (DC) power and provides the DC power to the DC link 236. As is generally understood, switching devices (e.g., IGBTs) used in the bridge circuits of the rotor side power converter 266 may be modulated to convert the AC power provided from the rotor bus 256 into DC power suitable for the DC link 236.

In addition, the line side converter 268 converts the DC power on the DC link 126 into AC output power suitable for the electrical grid 124. In particular, switching devices (e.g., IGBTs) used in bridge circuits of the line side converter 268 can be modulated to convert the DC power on the DC link 236 into AC power on the line side bus 288. The AC power from the power converter 262 can be combined with the power from the stator of DFIG 220 to provide multi-phase power (e.g., three-phase power) having a frequency maintained substantially at the frequency of the electrical grid 284 (e.g., 50 Hz or 60 Hz).

Additionally, various circuit breakers and switches, such as grid breaker 282, system breaker 278, stator sync switch 258, converter breaker 286, and line contactor 272 may be included in the system 200 to connect or disconnect corresponding buses, for example, when current flow is excessive and may damage components of the wind turbine system 100 or for other operational considerations. Additional protection components may also be included in the wind turbine system 200, such as the crowbar circuit described below.

Moreover, the power converter 262 may receive control signals from, for instance, the control system 276 via the controller 274. The control signals may be based, among other things, on sensed conditions or operating characteristics of the wind turbine system 200. Typically, the control signals provide for control of the operation of the power converter 262. For example, feedback in the form of a sensed speed of the DFIG 220 may be used to control the conversion of the output power from the rotor bus 256 to maintain a proper and balanced multi-phase (e.g., three-phase) power supply. Other feedback from other sensors may also be used by the controller 274 to control the power converter 262, including, for example, stator and rotor bus voltages and current feedbacks. Using the various forms of feedback information, switching control signals (e.g., gate timing commands for IGBTs), shorting control signals, stator synchronizing control signals, and circuit breaker signals may be generated.

Figure 6:
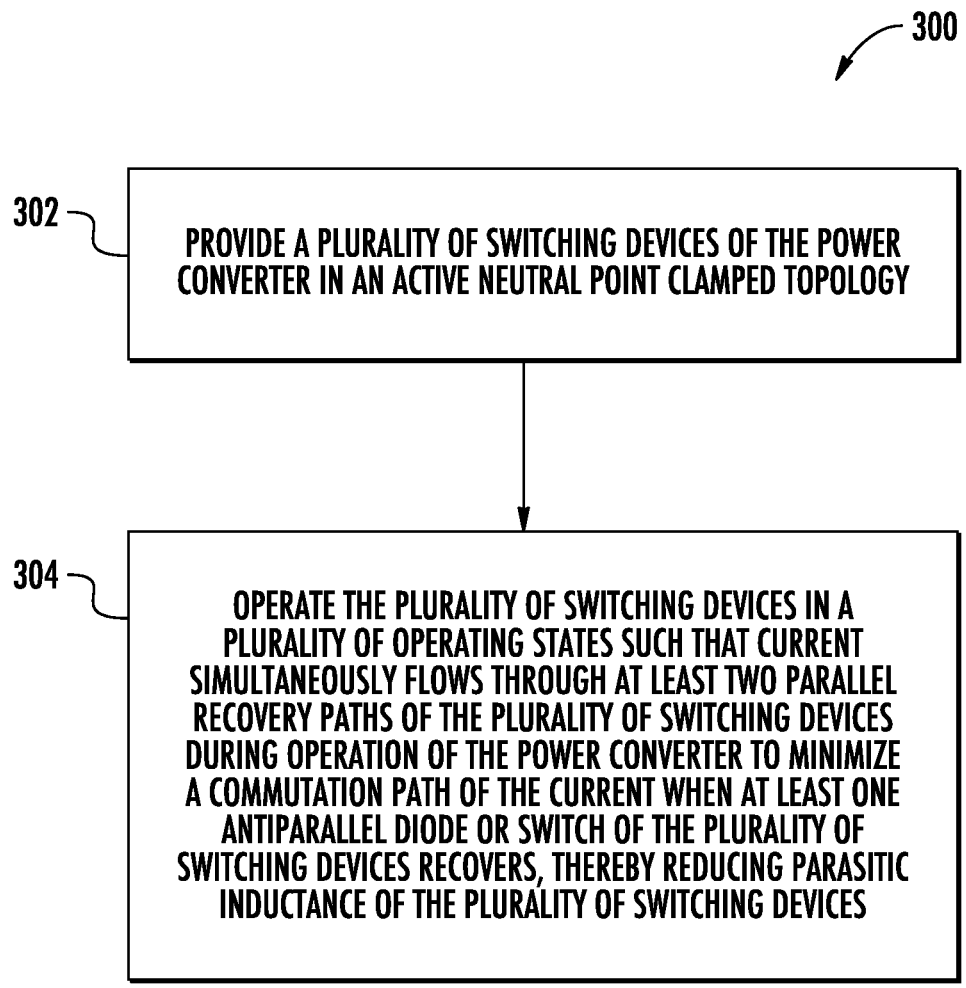
FIG. 6 illustrates a flow diagram of one embodiment of a method for operating a multi-level bridge power converter of an electrical power system connected to a power grid according to the present disclosure.

Referring now to FIG. 6, a flow diagram of one embodiment of a method 300 for operating a multi-level bridge power converter of an electrical power system connected to a power grid is illustrated in accordance with aspects of the present subject matter. In general, the method 300 will be described herein as being implemented using a wind turbine system, such as the DFIG wind turbine system 200 described above with reference to FIGS. 4, 5, and 7-9. However, it should be appreciated that the disclosed method 300 may be implemented using any other suitable power generation system that is configured to supply power for application to a load. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

Figure 7:
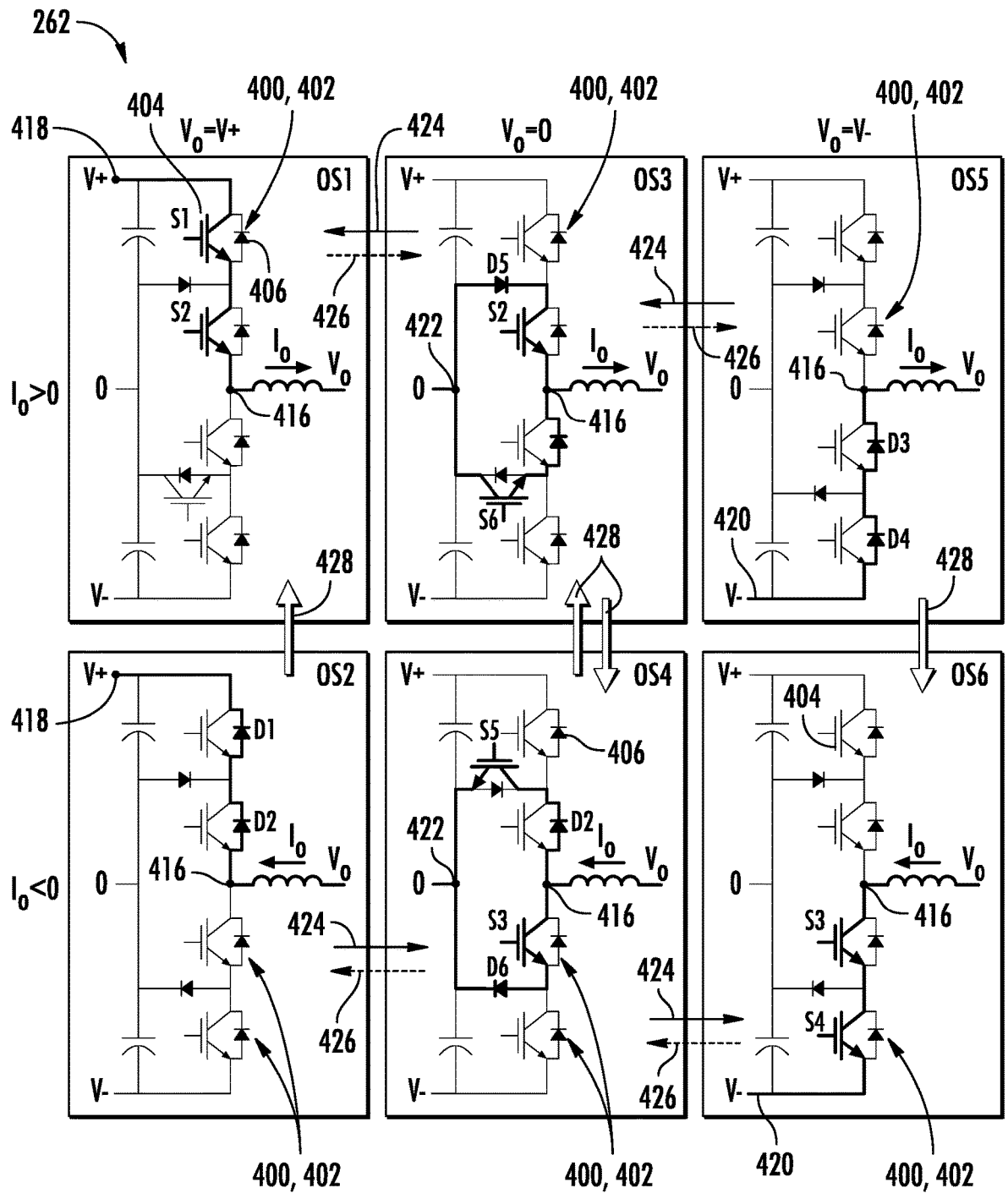
FIG. 7 illustrates a schematic diagram of one embodiment of a switching sequence of a three-level inverter according to the present disclosure.
Figure 8:
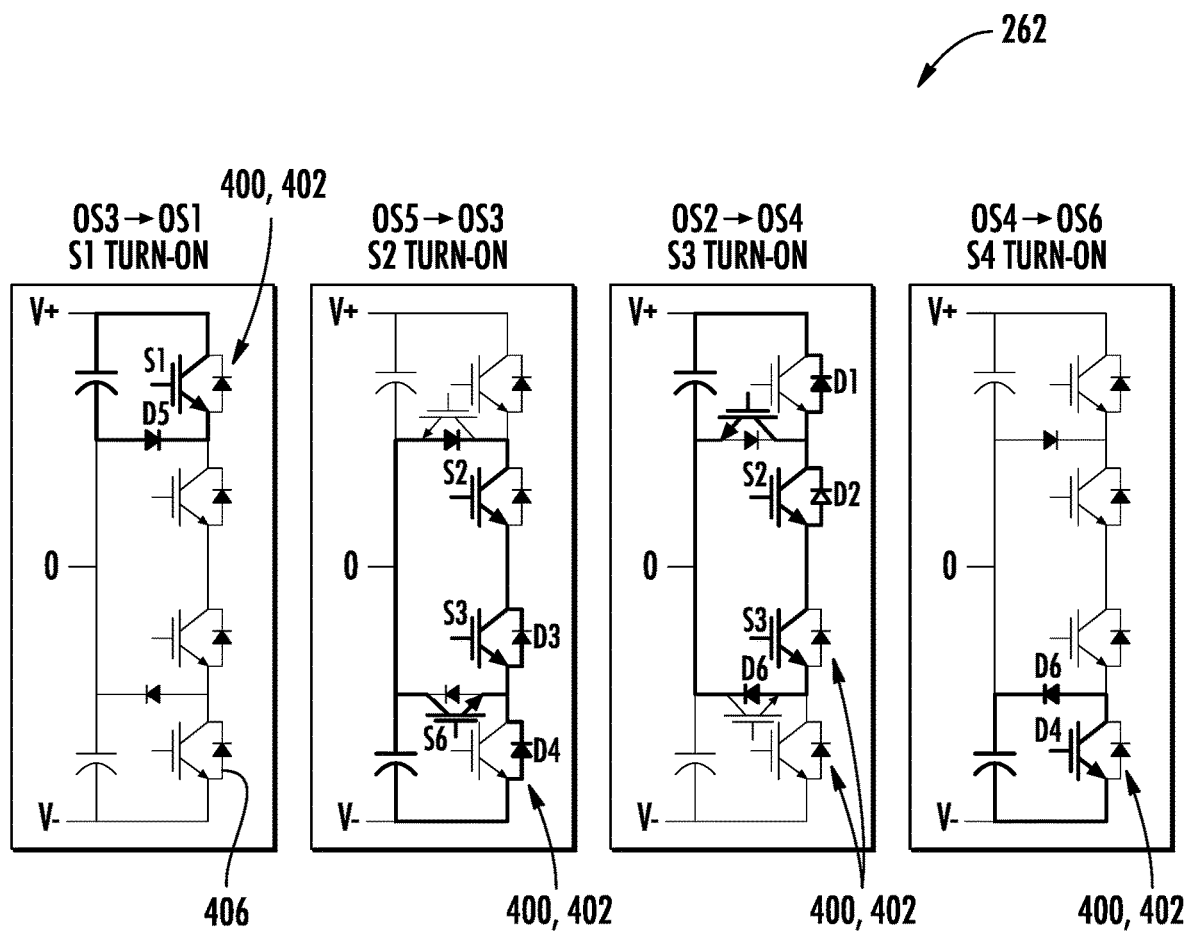
FIG. 8 illustrates a schematic diagram of diode recovery paths for a three-level inverter according to the present disclosure.
Figure 9:
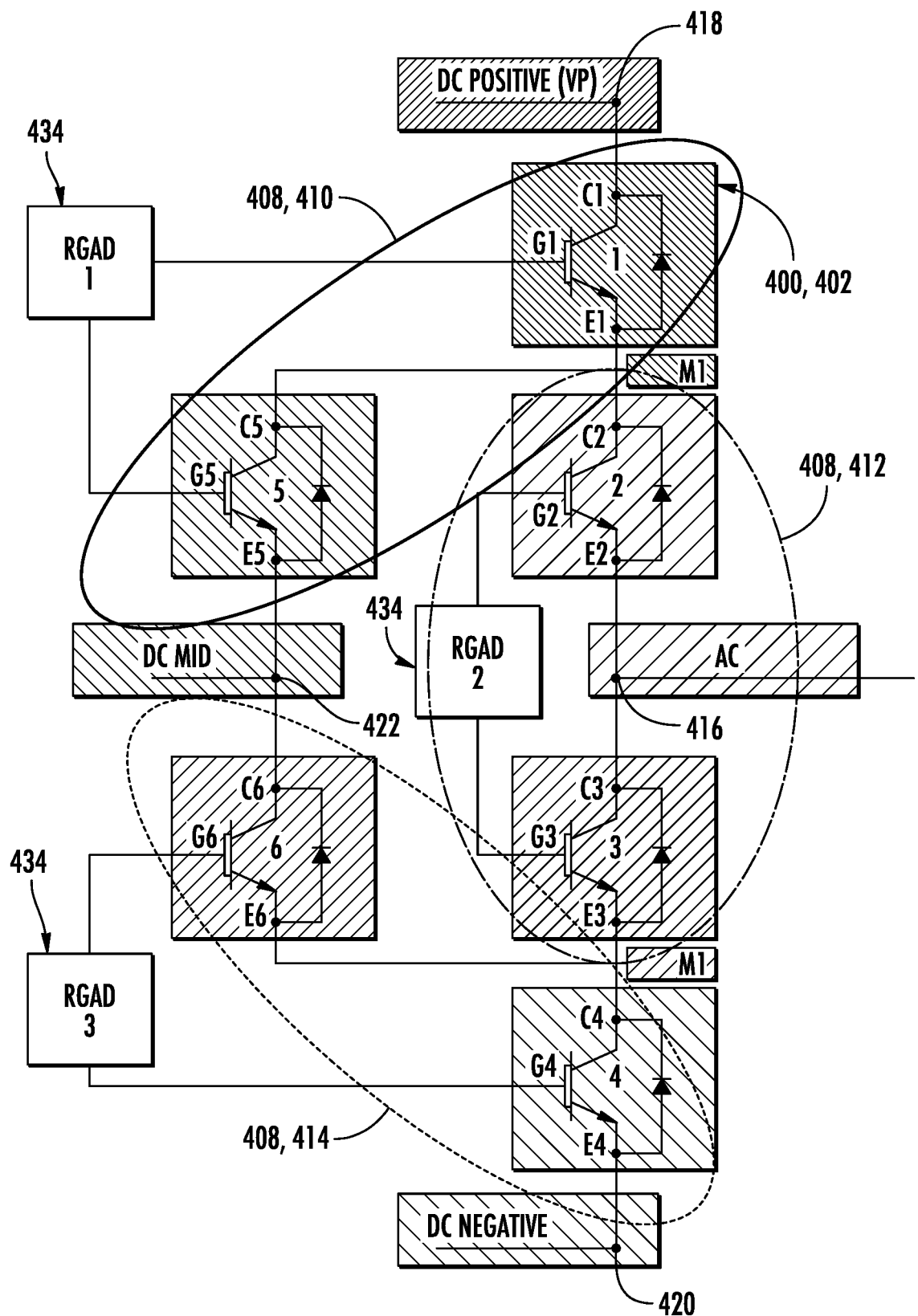
FIG. 9 illustrates a schematic diagram of a plurality of IGBT modules connected according to the present disclosure, particularly pairs of IGBT modules grouped together to form a plurality of IGBT module packages.

As shown at (302), the method 300 also includes providing a plurality of switching devices 400 of the power converter 262 in an active neutral point clamped topology. For example, as shown in FIGS. 7-10, the switching devices 400 may be insulated gate bipolar transistor (IGBT) modules 402. In such embodiments, as shown in FIGS. 7-9, each of the plurality of IGBT modules 402 may include at least one IGBT switch 404 and at least one antiparallel diode 406. More particularly, as shown particularly in FIGS. 9 and 10, the IGBT modules 402 may also be grouped into pairs to form an IGBT module package 408 such that each of the IGBT module packages 402 includes two IGBT switches 404 and two antiparallel diodes 406. For example, as shown, a first IGBT module package 410 may include a first IGBT switch S1 coupled to a first antiparallel diode D1 and a fifth IGBT module having a fifth IGBT switch S5 coupled to a fifth antiparallel diode D5. Further, as shown, a second IGBT module package 412 may include a second IGBT switch S2 coupled to a second antiparallel diode D2 and a third IGBT module having a third IGBT switch S3 coupled to a third antiparallel diode D3. Moreover, as shown, a third IGBT module package 414 may include a fourth IGBT module having a fourth IGBT switch S4 coupled to a fourth antiparallel diode D4 and a sixth IGBT module having a sixth IGBT switch S6 coupled to a sixth antiparallel diode D6. Thus, the method 300 may also electrically coupling the first and fifth IGBT modules together in series to form the first IGBT module package 410, electrically coupling the second and third IGBT module together in series to form the second IGBT module package 412, and electrically coupling the fourth and sixth IGBT module together in series to form the third IGBT module package 414.

Figure 10:
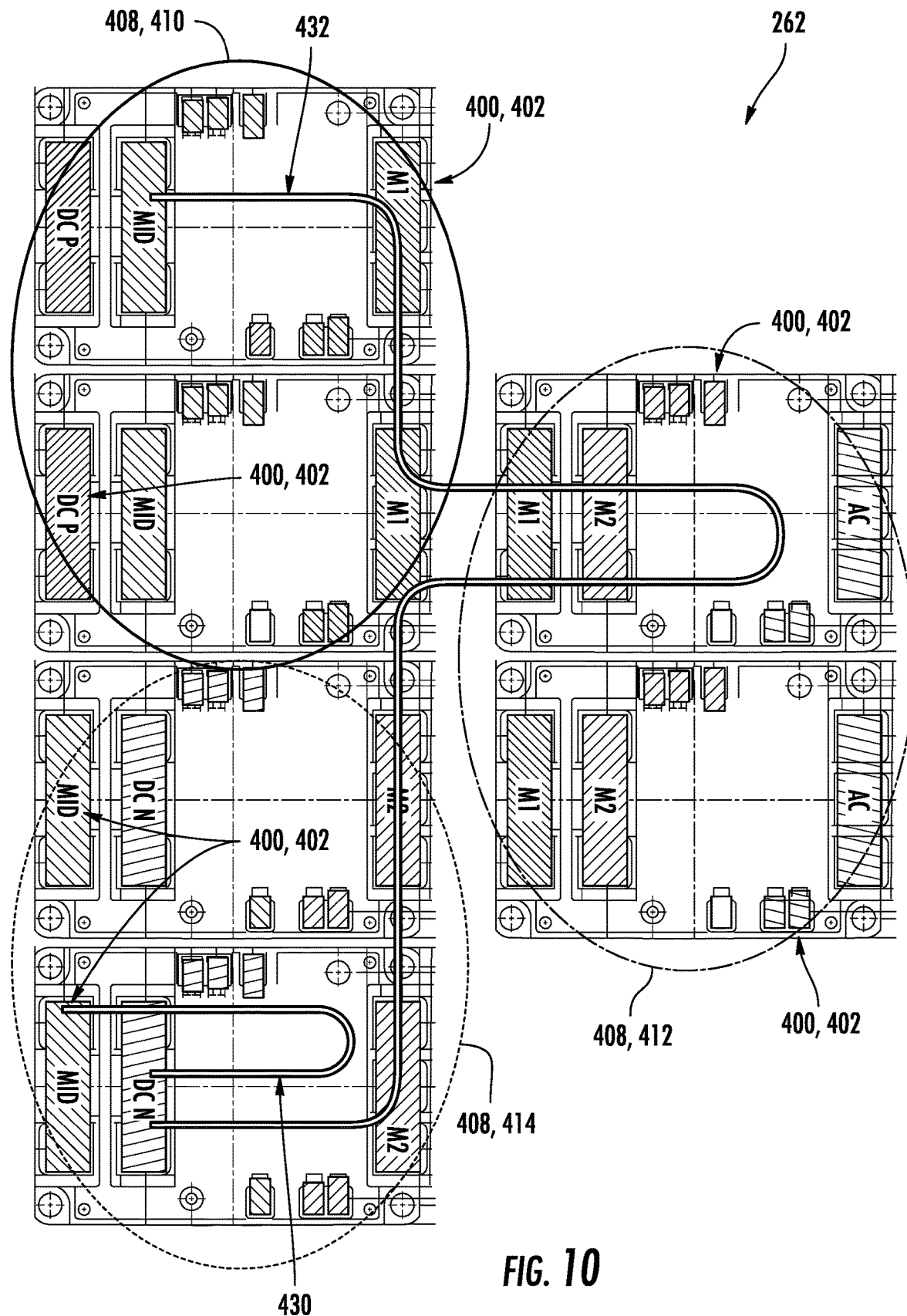
FIG. 10 illustrates a schematic diagram of a plurality of IGBT modules connected according to the present disclosure, particularly illustrating multiple recovery paths for diodes D1 and D4, with one of the recovery paths being shorter than the other.

In additional embodiments, as shown in FIG. 10, the method 300 may optionally include electrically coupling a gate amplifier 434 at a connection between one or more of the first and fifth IGBT modules 1, 5, the second and third IGBT modules 2, 3, and/or the fourth and sixth IGBT modules 4, 6. In particular embodiments, as shown, the gate amplifiers 434 are connected to respective gates (e.g., G1, G2, G3, G4, G5, and G6) of the IGBT modules 402.

Referring back to FIG. 6, as shown at (304), the method 300 also includes operating the plurality of switching devices 400 in a plurality of operating states such that current simultaneously flows through at least two parallel recovery paths of the plurality of switching devices 400 during operation of the power converter 262 to minimize a commutation path of the current when at least one antiparallel diode or switch of the plurality of switching devices 400 recovers, thereby reducing parasitic inductance affecting the recovering antiparallel diode or switch. For example, in such embodiments, the recovering diode(s) may be at least one of the first antiparallel diode D1, the second antiparallel diode D2, the third antiparallel diode D3, the fourth antiparallel diode D4, the fifth antiparallel diode D5, and/or the sixth antiparallel diode D6.

The switching sequence of the present disclosure can be better understood with respect to FIGS. 7 and 8. More specifically, in several embodiments, as shown in FIG. 7, operating the plurality of switching devices 400 in the plurality of operating states such that current simultaneously flows through the parallel recovery path(s) may include electrically connecting an alternating current (AC) terminal 416 of the power converter 262 to one of a positive voltage terminal 418, a negative voltage terminal 420, or a midpoint voltage terminal 422 via one or more of the plurality of switching devices 400.

Thus, in particular embodiments, as shown in FIG. 7, the plurality of operating states may include a first operating state OS1 having the AC terminal 416 electrically connected to the positive voltage terminal 418 by closing the first and second IGBT switches S1, S2. Further, as shown, another operating state may include a second operating state OS2 having the AC terminal 416 electrically connected to the positive voltage terminal 418 by closing the first and second antiparallel diodes D1, D2. Moreover, as shown, a third operating state OS3 may include the AC terminal 416 being electrically connected to the midpoint voltage terminal 422 by closing the second and sixth IGBT switches S2, S6 and the third and fifth antiparallel diodes D3, D5. In addition, a fourth operating state OS4 includes the AC terminal 416 being electrically connected to the midpoint voltage terminal 422 by closing the third and fifth IGBT switches S3, S5 and the second and sixth antiparallel diodes D2, D6. Furthermore, as shown, a fifth operating state OS5 has the AC terminal 416 electrically connected to the negative voltage terminal 420 by closing the third and fourth antiparallel diodes D3, D4. Moreover, a sixth operating state OS6 may include the AC terminal 416 being electrically connected to the negative voltage terminal 420 by closing the third and fourth IGBT switches S3 and S4. The current flow for the respective operating states is indicated by arrow $I_O$. In addition, arrows 424 indicate hard diode recovery, arrows 426 indicate lossless recovery, and arrows 428 indicate the transition controlled by the current direction. As used herein, hard diode recovery generally refers to diode recovery occurring when the diode is required to block full voltage of a half-DC-link in the power converter 262, whereas lossless recovery generally refers to diode recovery that does not require full voltage blockage after the diode stops conducting current.

Thus, in an embodiment, as shown in FIGS. 8 and 10, operation of the switching devices 400 may include transitioning from the fifth operating state OS5 to the third operating state OS3 such that the current from recovery of the first and fourth diodes D1, D4 flows through at least two parallel recovery paths 430, 432. Similarly, as shown, operation of the switching devices 400 may also include transitioning from the second operating state OS2 to the fourth operating state OS4 such that the current from recovery of the first and fourth diodes D1, D4 flows through two parallel recovery paths 430, 432. In such embodiments, as shown, the two parallel recovery paths may include, at least, a first recovery path 430 and a second recovery path 430. Thus, as shown, one of the two parallel recovery paths (e.g., recovery path 430) may be shorter than the other (e.g., recovery path 432).

Figure 11:
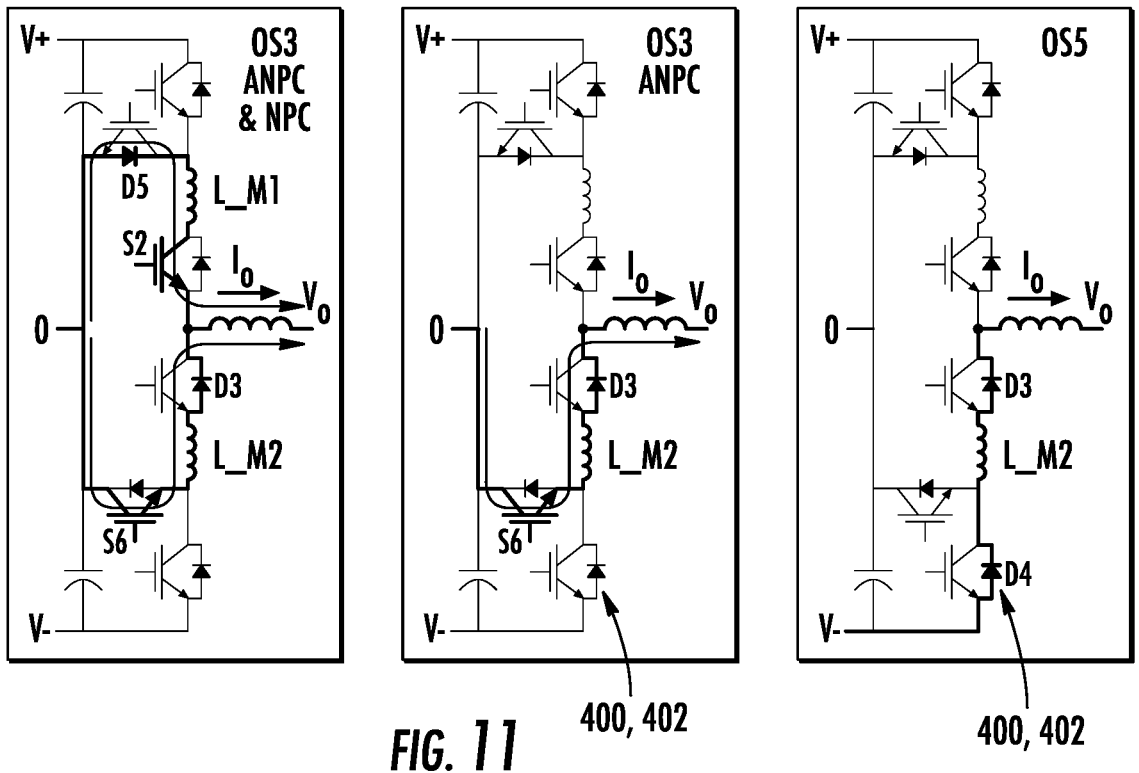
FIG. 11 illustrates a schematic diagram of switch recovery paths for a three-level inverter according to the present disclosure, particularly illustrating positive current recovery paths.
Figure 12:
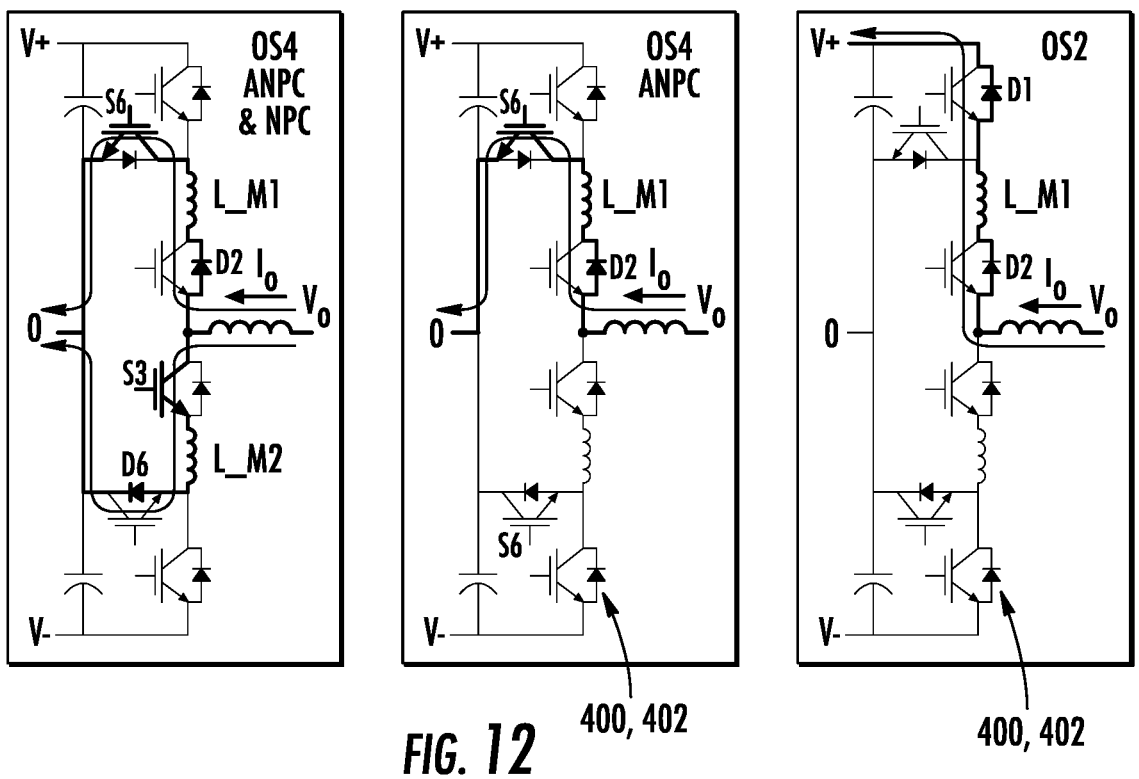
FIG. 12 illustrates a schematic diagram of switch recovery paths for a three-level inverter according to the present disclosure, particularly illustrating negative current recovery paths.

Referring now to FIGS. 11 and 12, schematic diagrams of switch recovery paths for a three-level inverter according to the present disclosure are provided, particularly illustrating positive current recovery paths (FIG. 11) and negative current recovery paths (FIG. 12). In particular, as shown, the inductance is controlled using a staggered ANPC turnoff sequence. For example, in an embodiment, transitioning from the third operating state to the fifth operating state may include turning off the second IGBT switch S2, thereby allowing a first parasitic inductance between the fifth diode D5 and the second IGBT switch S2 to discharge energy without forcing excessive voltage across the second IGBT switch and subsequently turning off the sixth IGBT switch S6, thereby allowing energy in a second parasitic inductance between the sixth IGBT switch S6 and the third antiparallel diode D3 to remain as-is. More specifically, as shown in FIG. 11, from the third operating state OS3 (e.g., 3 ANPC & NPC) to an intermediate state (e.g., 3 ANPC), a first parasitic inductance (e.g., L_M1) must discharge energy but is not required to force a high voltage across the second IGBT switch S2, since the second IGBT switch S2 does not need to block any voltage yet. From the intermediate state 3 ANPC to the fifth operating state OS5, all energy in a second parasitic inductance (e.g., L_M2) can remain as-is and does not cause a voltage overshoot across the sixth IGBT switch S6 when it turns off. Only internal module inductances contribute to voltage overshoots for the sixth IGBT switch S6.

In addition, in an embodiment, transitioning from the fourth operating state to the second operating state may include turning off the third IGBT switch S3, thereby allowing the second parasitic inductance to discharge energy without forcing excessive voltage across the third IGBT switch S3 and subsequently turning off the fifth IGBT switch S5, thereby allowing energy in the first parasitic inductance to remain as-is. More specifically, as shown in FIG. 12, from the fourth operating state OS4 (e.g., 4 ANPC & NPC) to an intermediate state (e.g., 4 ANPC), the second parasitic inductance must discharge energy but is not required to force a high voltage across the third IGBT switch S3, since the third IGBT switch S3 does not need to block any voltage yet. From the intermediate state 4 ANPC to the second operating state OS2, all energy in the first parasitic inductance can remain as-is and is not required to cause a voltage overshoot across the fifth IGBT switch S5 when it turns off. Only internal module inductances contribute to voltage overshoots for the fifth IGBT switch S5.

Further aspects of the disclosure are provided by the subject matter of the following clauses:

Clause 1. A method for operating a multi-level bridge power converter of an electrical power system connected to a power grid, the power converter having a first converter coupled to a second converter via a DC link, the method comprising:

providing a plurality of switching devices of the power converter in an active neutral point clamped topology; and operating the plurality of switching devices in a plurality of operating states such that current simultaneously flows through at least two parallel recovery paths of the plurality of switching devices during operation of the power converter to minimize a commutation path of the current when at least one antiparallel diode or switch of the plurality of switching devices recovers, thereby reducing parasitic inductance affecting the antiparallel diode or the switch.

Clause 2. The method of clause 1, wherein the plurality of switching devices comprises, at least, a plurality of insulated gate bipolar transistor (IGBT) modules, wherein each of the plurality of IGBT modules comprises at least one IGBT switch and at least one antiparallel diode.

Clause 3. The method of clause 2, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, the at least one antiparallel diode comprising at least one of the first antiparallel diode, the second antiparallel diode, the third antiparallel diode, the fourth antiparallel diode, the fifth antiparallel diode, or the sixth antiparallel diode.

Clause 4. The method of clause 3, further comprising:

electrically coupling the first and fifth IGBT module together in series to form a first IGBT module package;

electrically coupling the second and third IGBT module together in series to form a second IGBT module package; and electrically coupling the fourth and sixth IGBT module together in series to form a third IGBT module package.

Clause 5. The method of clause 4, further comprising electrically coupling a gate amplifier at a connection between at least one of the first and fifth IGBT module, the second and third IGBT module, or the fourth and sixth IGBT module.

Clause 6. The method of clauses 3-4, wherein operating the plurality of switching devices in the plurality of operating states such that current simultaneously flows through the at least two parallel recovery paths of the plurality of switching devices during operation of the power converter further comprises:

electrically connecting an alternating current (AC) terminal of the power converter to one of a positive voltage terminal, a negative voltage terminal, or a midpoint voltage terminal via one or more of the plurality of switching devices.

Clause 7. The method of clause 6, wherein the plurality of operating states comprises at least one of a first operating state having the AC terminal electrically connected to the positive voltage terminal by closing the first and second IGBT switches, a second operating state having the AC terminal electrically connected to the positive voltage terminal by closing the first and second antiparallel diodes, a third operating state having the AC terminal electrically connected to the midpoint voltage terminal by closing the second and sixth IGBT switches and the third and fifth antiparallel diodes, a fourth operating state having the AC terminal electrically connected to the midpoint voltage terminal by closing the third and fifth IGBT switches and the second and sixth antiparallel diodes, a fifth operating state having the AC terminal electrically connected to the negative voltage terminal by closing the third and fourth antiparallel diodes, and a sixth operating state having the AC terminal electrically connected to the negative voltage terminal by closing the third and fourth IGBT switches.

Clause 8. The method of clause 7, wherein operating the plurality of switching devices in the plurality of operating states such that current simultaneously flows through the at least two parallel recovery paths of the plurality of switching devices during operation of the power converter further comprises:

transitioning from the fifth operating state to the third operating state such that the current from recovery of the first and fourth diodes flows through the at least two parallel recovery paths, at least one of the two parallel recovery paths being shorter than the other.

Clause 9. The method of clause 7, wherein operating the plurality of switching devices in the plurality of operating states such that current simultaneously flows through the at least two parallel recovery paths of the plurality of switching devices during operation of the power converter further comprises:

transitioning from the second operating state to the fourth operating state such that the current from recovery of the first and fourth diodes flows through the at least two parallel recovery paths, at least one of the two parallel recovery paths being shorter than the other.

Clause 10. The method of clause 7, wherein operating the plurality of switching devices in the plurality of operating states such that current simultaneously flows through the at least two parallel recovery paths of the plurality of switching devices during operation of the power converter further comprises:

transitioning from the third operating state to the fifth operating state by:

turning off the second IGBT switch, thereby allowing a first parasitic inductance between the fifth diode and the second IGBT switch to discharge energy without forcing excessive voltage across the second IGBT switch; and subsequently turning off the sixth IGBT switch, thereby allowing energy in a second parasitic inductance between the sixth IGBT switch and the third antiparallel diode to remain as-is.

Clause 11. The method of clause 10, wherein operating the plurality of switching devices in the plurality of operating states such that current simultaneously flows through the at least two parallel recovery paths of the plurality of switching devices during operation of the power converter further comprises:

transitioning from the fourth operating state to the second operating state by:

turning off the third IGBT switch, thereby allowing the second parasitic inductance to discharge energy without forcing excessive voltage across the third IGBT switch; and subsequently turning off the fifth IGBT switch, thereby allowing energy in the first parasitic inductance to remain as-is.

Clause 12. The method of any of the preceding clauses, wherein the multi-level bridge power converter is a three-level bridge power converter, and wherein the electrical power system comprises a wind turbine power system, a solar power system, an energy storage power system, or combinations thereof.

Clause 13. An electrical power system, comprising:

a doubly-fed induction generator having a rotor and a stator, the stator providing AC power to a stator bus;

a multi-level bridge power converter coupled to the rotor of the doubly-fed induction generator, the power converter comprising a first converter coupled to a second converter via a DC link, at least one of the first converter or the second converter comprising a plurality of switching devices arranged in an active neutral point clamped topology;

a controller communicatively coupled to the power converter, the controller comprising at least one processor configured to implement a plurality of operations, the plurality of operations comprising:

operating the plurality of switching devices in a plurality of operating states such that current simultaneously flows through at least two parallel recovery paths of the plurality of switching devices during operation of the power converter to minimize a commutation path of the current when at least one antiparallel diode or switch of the plurality of switching devices recovers, thereby reducing parasitic inductance affecting the antiparallel diode or the switch.

Clause 14. The system of clause 13, wherein the plurality of switching devices comprises, at least, a plurality of insulated gate bipolar transistor (IGBT) modules, wherein each of the plurality of IGBT modules comprises at least one IGBT switch and at least one antiparallel diode, and wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, the at least one diode comprising at least one of the first antiparallel diode, the second antiparallel diode, the third antiparallel diode, the fourth antiparallel diode, the fifth antiparallel diode, or the sixth antiparallel diode.

Clause 15. The system of clause 14, further comprising:

electrically coupling the first and fifth IGBT module together in series to form a first IGBT module package;

electrically coupling the second and third IGBT module together in series to form a second IGBT module package; and electrically coupling the fourth and sixth IGBT module together in series to form a third IGBT module package.

Clause 16. The system of clause 15, further comprising electrically coupling a gate amplifier at a connection between at least one of the first and fifth IGBT module, the second and third IGBT module, or the fourth and sixth IGBT module.

Clause 17. The system of clause 16, wherein operating the plurality of switching devices in the plurality of operating states such that current simultaneously flows through the at least two parallel recovery paths of the plurality of switching devices during operation of the power converter further comprises:

electrically connecting an alternating current (AC) terminal of the power converter to one of a positive voltage terminal, a negative voltage terminal, or a midpoint voltage terminal via one or more of the plurality of switching devices.

Clause 18. The system of clause 17, wherein the plurality of operating states comprises at least one of a first operating state having the AC terminal electrically connected to the positive voltage terminal by closing the first and second IGBT switches, a second operating state having the AC terminal electrically connected to the positive voltage terminal by closing the first and second antiparallel diodes, a third operating state having the AC terminal electrically connected to the midpoint voltage terminal by closing the second and sixth IGBT switches and the third and fifth antiparallel diodes, a fourth operating state having the AC terminal electrically connected to the midpoint voltage terminal by closing the third and fifth IGBT switches and the second and sixth antiparallel diodes, a fifth operating state having the AC terminal electrically connected to the negative voltage terminal by closing the third and fourth antiparallel diodes, and a sixth operating state having the AC terminal electrically connected to the negative voltage terminal by closing the third and fourth IGBT switches.

Clause 19. The system of clause 18, wherein operating the plurality of switching devices in the plurality of operating states such that current simultaneously flows through the at least two parallel recovery paths of the plurality of switching devices during operation of the power converter further comprises:

transitioning from the third operating state to the fifth operating state such that the current from recovery of the first and fourth diodes flows through the at least two parallel recovery paths, at least one of the two parallel recovery paths being shorter than the other; and, transitioning from the fourth operating state to the second operating state such that the current from recovery of the first and fourth diodes flows through the at least two parallel recovery paths, at least one of the two parallel recovery paths being shorter than the other.

Clause 20. The system of clauses 18-19, wherein operating the plurality of switching devices in the plurality of operating states such that current simultaneously flows through the at least two parallel recovery paths of the plurality of switching devices during operation of the power converter further comprises:

transitioning from the third operating state to the fifth operating state by:

turning off the second IGBT switch, thereby allowing a first parasitic inductance between the fifth diode and the second IGBT switch to discharge energy without forcing excessive voltage across the second IGBT switch; and subsequently turning off the sixth IGBT switch, thereby allowing energy in a second parasitic inductance between the sixth IGBT switch and the third antiparallel diode to remain as-is; and, transitioning from the fourth operating state to the second operating state by:

turning off the third IGBT switch, thereby allowing the second parasitic inductance to discharge energy without forcing excessive voltage across the third IGBT switch; and subsequently turning off the fifth IGBT switch, thereby allowing energy in the first parasitic inductance to remain as-is.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a multi-level bridge power converter of an electrical power system connected to a power grid, the power converter having a first converter coupled to a second converter via a DC link, the method comprising:

providing a plurality of switching devices of the power converter in an active neutral point clamped topology; and operating the plurality of switching devices in a plurality of operating states such that current simultaneously flows through at least two parallel recovery paths of the plurality of switching devices during operation of the power converter to minimize a commutation path of the current when at least one antiparallel diode or switch of the plurality of switching devices recovers, thereby reducing parasitic inductance affecting the antiparallel diode or the switch, wherein the plurality of switching devices comprises, at least, a plurality of insulated gate bipolar transistor (IGBT) modules, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, and wherein the at least two parallel recovery paths of the plurality of switching devices comprises a first recovery path and a second recovery path, wherein the first recovery path comprises one of (1) the fifth antiparallel diode and the second IGBT switch or (2) the second antiparallel diode and the fifth IGBT switch, and wherein the second recovery path comprises one of (1) the sixth IGBT switch and the third antiparallel diode or (2) the third IGBT switch and the sixth antiparallel diode.

2. The method of claim 1, further comprising:

electrically coupling the first and fifth IGBT module together in series to form a first IGBT module package;

electrically coupling the second and third IGBT module together in series to form a second IGBT module package; and electrically coupling the fourth and sixth IGBT module together in series to form a third IGBT module package.

3. The method of claim 2, further comprising electrically coupling a gate amplifier at a connection between at least one of the first and fifth IGBT module, the second and third IGBT module, or the fourth and sixth IGBT module.

4. The method of claim 1, wherein operating the plurality of switching devices in the plurality of operating states such that current simultaneously flows through the at least two parallel recovery paths of the plurality of switching devices during operation of the power converter further comprises:

electrically connecting an alternating current (AC) terminal of the power converter to one of a positive voltage terminal, a negative voltage terminal, or a midpoint voltage terminal via one or more of the plurality of switching devices.

5. The method of claim 4, wherein the plurality of operating states comprises at least one of a first operating state having the AC terminal electrically connected to the positive voltage terminal by closing the first and second IGBT switches, a second operating state having the AC terminal electrically connected to the positive voltage terminal by closing the first and second antiparallel diodes, a third operating state having the AC terminal electrically connected to the midpoint voltage terminal by closing the second and sixth IGBT switches and the third and fifth antiparallel diodes, a fourth operating state having the AC terminal electrically connected to the midpoint voltage terminal by closing the third and fifth IGBT switches and the second and sixth antiparallel diodes, a fifth operating state having the AC terminal electrically connected to the negative voltage terminal by closing the third and fourth antiparallel diodes, and a sixth operating state having the AC terminal electrically connected to the negative voltage terminal by closing the third and fourth IGBT switches.

6. The method of claim 5, wherein operating the plurality of switching devices in the plurality of operating states such that current simultaneously flows through the at least two parallel recovery paths of the plurality of switching devices during operation of the power converter further comprises:

transitioning from the fifth operating state to the third operating state such that the current from recovery of the first and fourth diodes flows through the at least two parallel recovery paths, at least one of the two parallel recovery paths being shorter than the other.

7. The method of claim 5, wherein operating the plurality of switching devices in the plurality of operating states such that current simultaneously flows through the at least two parallel recovery paths of the plurality of switching devices during operation of the power converter further comprises:

transitioning from the second operating state to the fourth operating state such that the current from recovery of the first and fourth diodes flows through the at least two parallel recovery paths, at least one of the two parallel recovery paths being shorter than the other.

8. The method of claim 5, wherein operating the plurality of switching devices in the plurality of operating states such that current simultaneously flows through the at least two parallel recovery paths of the plurality of switching devices during operation of the power converter further comprises:
transitioning from the third operating state to the fifth operating state by:
turning off the second IGBT switch, thereby allowing a first parasitic inductance between the fifth diode and the second IGBT switch to discharge energy without forcing excessive voltage across the second IGBT switch; and
subsequently turning off the sixth IGBT switch, thereby allowing energy in a second parasitic inductance between the sixth IGBT switch and the third antiparallel diode to remain as-is such that turning off the sixth IGBT does not cause a voltage overshoot across the sixth IGBT.

9. The method of claim 8, wherein operating the plurality of switching devices in the plurality of operating states such that current simultaneously flows through the at least two parallel recovery paths of the plurality of switching devices during operation of the power converter further comprises:
transitioning from the fourth operating state to the second operating state by:
turning off the third IGBT switch, thereby allowing the second parasitic inductance to discharge energy without forcing excessive voltage across the third IGBT switch; and
subsequently turning off the fifth IGBT switch, thereby allowing energy in the first parasitic inductance to remain as-is such that turning off the fifth IGBT does not cause a voltage overshoot across the fifth IGBT.

10. The method of claim 1, wherein the multi-level bridge power converter is a three-level bridge power converter, and wherein the electrical power system comprises a wind turbine power system, a solar power system, an energy storage power system, or combinations thereof.

11. An electrical power system, comprising:
a doubly-fed induction generator having a rotor and a stator, the stator providing AC power to a stator bus;
a multi-level bridge power converter coupled to the rotor of the doubly-fed induction generator, the power converter comprising a first converter coupled to a second converter via a DC link, at least one of the first converter or the second converter comprising a plurality of switching devices arranged in an active neutral point clamped topology;
a controller communicatively coupled to the power converter, the controller comprising at least one processor configured to implement a plurality of operations, the plurality of operations comprising:
operating the plurality of switching devices in a plurality of operating states such that current simultaneously flows through at least two parallel recovery paths of the plurality of switching devices during operation of the power converter to minimize a commutation path of the current when at least one antiparallel diode or switch of the plurality of switching devices recovers, thereby reducing parasitic inductance affecting the antiparallel diode or the switch,
wherein the plurality of switching devices comprises, at least, a plurality of insulated gate bipolar transistor (IGBT) modules,
wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, and
wherein the at least two parallel recovery paths of the plurality of switching devices comprises a first recovery path and a second recovery path, wherein the first recovery path comprises one of (1) the fifth antiparallel diode and the second IGBT switch or (2) the second antiparallel diode and the fifth IGBT switch, and wherein the second recovery path comprises one of (1) the sixth IGBT switch and the third antiparallel diode or (2) the third IGBT switch and the sixth antiparallel diode.

12. The system of claim 11, further comprising:
electrically coupling the first and fifth IGBT module together in series to form a first IGBT module package;
electrically coupling the second and third IGBT module together in series to form a second IGBT module package; and
electrically coupling the fourth and sixth IGBT module together in series to form a third IGBT module package.

13. The system of claim 12, further comprising electrically coupling a gate amplifier at a connection between at least one of the first and fifth IGBT module, the second and third IGBT module, or the fourth and sixth IGBT module.

14. The system of claim 13, wherein operating the plurality of switching devices in the plurality of operating states such that current simultaneously flows through the at least two parallel recovery paths of the plurality of switching devices during operation of the power converter further comprises:
electrically connecting an alternating current (AC) terminal of the power converter to one of a positive voltage terminal, a negative voltage terminal, or a midpoint voltage terminal via one or more of the plurality of switching devices.

15. The system of claim 14, wherein the plurality of operating states comprises at least one of a first operating state having the AC terminal electrically connected to the positive voltage terminal by closing the first and second IGBT switches, a second operating state having the AC terminal electrically connected to the positive voltage terminal by closing the first and second antiparallel diodes, a third operating state having the AC terminal electrically connected to the midpoint voltage terminal by closing the second and sixth IGBT switches and the third and fifth antiparallel diodes, a fourth operating state having the AC terminal electrically connected to the midpoint voltage terminal by closing the third and fifth IGBT switches and the second and sixth antiparallel diodes, a fifth operating state having the AC terminal electrically connected to the negative voltage terminal by closing the third and fourth antiparallel diodes, and a sixth operating state having the AC terminal electrically connected to the negative voltage terminal by closing the third and fourth IGBT switches.

16. The system of claim 15, wherein operating the plurality of switching devices in the plurality of operating states such that current simultaneously flows through the at least two parallel recovery paths of the plurality of switching devices during operation of the power converter further comprises:

transitioning from the third operating state to the fifth operating state such that the current from recovery of the first and fourth diodes flows through the at least two parallel recovery paths, at least one of the two parallel recovery paths being shorter than the other; and, transitioning from the fourth operating state to the second operating state such that the current from recovery of the first and fourth diodes flows through the at least two parallel recovery paths, at least one of the two parallel recovery paths being shorter than the other.

17. The system of claim 15, wherein operating the plurality of switching devices in the plurality of operating states such that current simultaneously flows through the at least two parallel recovery paths of the plurality of switching devices during operation of the power converter further comprises:

transitioning from the third operating state to the fifth operating state by:

turning off the second IGBT switch, thereby allowing a first parasitic inductance between the fifth diode and the second IGBT switch to discharge energy without forcing excessive voltage across the second IGBT switch; and subsequently turning off the sixth IGBT switch, thereby allowing energy in a second parasitic inductance between the sixth IGBT switch and the third antiparallel diode to remain as-is such that turning off the sixth IGBT does not cause a voltage overshoot across the sixth IGBT; and, transitioning from the fourth operating state to the second operating state by:

turning off the third IGBT switch, thereby allowing the second parasitic inductance to discharge energy without forcing excessive voltage across the third IGBT switch; and subsequently turning off the fifth IGBT switch, thereby allowing energy in the first parasitic inductance to remain as-is such that turning off the fifth IGBT does not cause a voltage overshoot across the fifth IGBT.

\* \* \* \* \*